Sept. 20, 1927.
R. E. CURTIS
INDICATOR
Filed Jan. 29, 1926
1,643,238
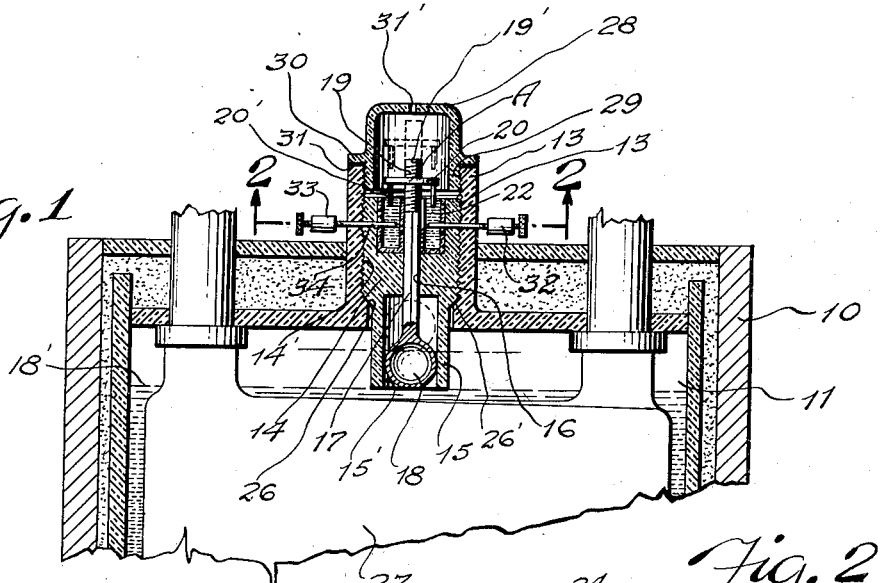
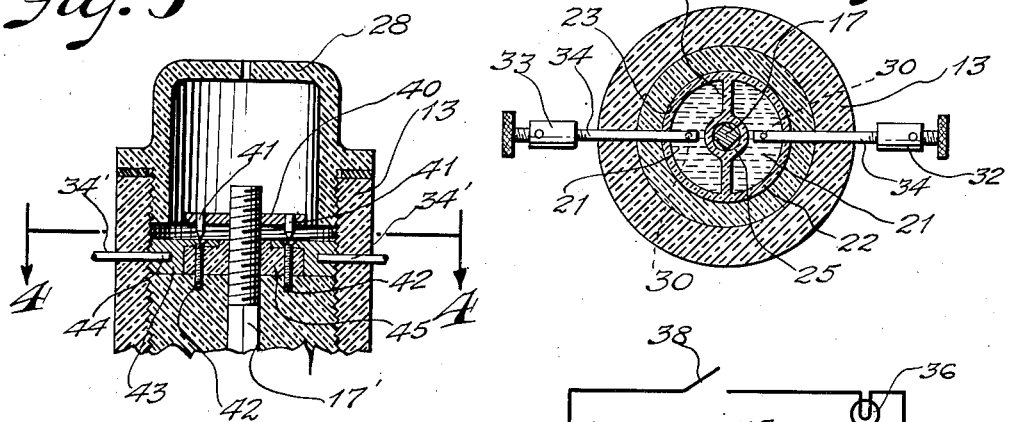
ROBERT E. CURTIS
INVENTOR
BY Victor J. Evans
ATTORNEY Patented Sept. 20, 1927.

1,643,238

UNITED STATES PATENT OFFICE.

ROBERT E. CURTIS, OF BENTON HARBOR, MICHIGAN.

INDICATOR.

Application filed January 29, 1926. Serial No. 84,708.

This invention relates to indicators and more particularly to a device of such character adapted for use upon storage batteries for indicating the level of fluid within any cell of the battery when the level has fallen to a point where the further lowering of the level below that point would be detrimental to the cells of the storage battery.

An object of the invention is to provide each cell of the storage battery with an automatically operated circuit breaker controlling the electrical energy to a signalling element independently of the other circuit breakers of the other cells and wherein each circuit breaker has confined therein a body of mercury or other conductive fluid serving to complete a connection between conductor elements of the circuit breaker and further serving to protect the conductor elements from corrosion due to the acid condition of the sulphuric acid or other fluid within the cells.

Another object of the invention is the production of a device of this character which can be manufactured at an economical cost and installed as a part of a storage battery by removing the ordinary cell cap therefrom and substituting the device therefor.

Other objects will appear hereinafter.

The invention consists in the novel combination and arrangement of parts to be hereinafter described and claimed.

The invention will be best understood by reference to the accompanying drawing showing the preferred form of construction of my invention and in which:

Fig. 1 is a fragmentary vertical sectional view of a storage battery showing the invention associated therewith, Fig. 2 is a sectional view of the same taken substantially on line 2—2 of Fig. 1, Fig. 3 is a fragmentary sectional view of an indicator similar to that illustrated in Fig. 1, but showing a modified form of construction, Fig. 4 is a sectional view of the same taken substantially on line 4—4 of Fig. 3, and Fig. 5 is a top plan view of the storage battery illustrated in Fig. 1 showing the method of connecting the indicators in parallel circuit.

Referring again to the drawing, particularly to Figs. 1 and 2, showing the preferred form of construction, a storage battery is indicated at 10 and includes a plurality of cells 11 each of which are provided with a neck portion 13 threaded internally as at 13′ to receive an indicator A the construction of which will now be described.

The indicator A includes a body 14 externally threaded as at 14′ for threaded engagement within the neck 13. This body includes a depending shank portion 15 providing an open compartment 15′ in communication with which is a central passage 16 formed in the body 14. This passage is adapted to slidably accommodate a plunger 17 having a hollow float ball 18 formed on its lower end. This float ball is confined in the compartment 15′ and is held within the compartment by the buoyant action of the fluid 18′ within the cell. This float and plunger is preferably formed of non-conductive material which will not absorb the fluid or be enlarged thereby. The upper end portion 19 of the plunger is threaded as at 19′ to receive a bridging contact 20 formed of conductive material and provided with opposite depending conductor fingers 20′ adapted when the float is in its lower position, as shown in full lines in Fig. 1, and when the fluid is at a dangerous level, to enter into opposite chambers 21 of a receptacle 22 and be partially submerged in the mercury confined in the chambers. The bridging contact by reason of its threaded engagement with the upper end of the plunger can be threaded longitudinally of this portion of the plunger. This receptacle is formed of such material as will best serve the purpose and is confined in a recess 23 formed in the body 14 contiguous of its top portion. The receptacle has a central partition 24 formed therein which separates the chambers and this partition is provided with a central passage 25 slidably receiving a portion of the plunger 16 as best illustrated in Fig. 1.

The body has contiguous its shank portion 15, a bevel edge 26 adapted for abutment with a bevel shoulder 26′ formed integral with the neck 13 to limit the downward position of the body so that the end of the shank portion will not contact with the top edges of the electrode plates 27 of the battery. When the body is in its proper position, as illustrated in Fig. 1, the neck 13 is closed by a hollow cap 28 having a threaded shank 29 formed thereon for threaded engagement within the neck and provided with an annular flange 30 adapted to bear against the top peripheral edges 31 of the neck, the cap being provided with the usual vent port 31'.

As illustrated in Fig. 1 there is provided on opposite corresponding sides of the neck, exterior of the storage battery, terminals 32 and 33 having conductor pins 34 passing through the body 14 and the walls of the receptacle 22 with end portions confined in the body of mercury within the chambers. To these terminals are connected the circuit wires 35, as illustrated in Fig. 5 showing a diagrammatical top plan view of the storage battery.

As herein indicated each of the cells of the storage battery is provided with an indicator similar in structure to that herein described which are connected in parallel circuit with a light bulb 36 in the following manner.

It will be noted that the end positive terminal post 37 of the storage battery is connected in circuit with a switch 38 which in turn is connected in circuit to the light bulb 36. This light bulb is also connected in circuit with the terminals 33 of the indicators. The end negative terminal post 39 of the storage battery is connected in circuit with the other terminals 32 thus completing an electrical circuit between the storage battery and light bulb when the switch 38 is closed and when the bridging contact of any one of the indicators A is lowered to submerge the conductor pins 30 in the mercury contained in the receptacle to complete a connection between the conductor pins 34, this lowering of the bridging contact being in the following manner.

Referring to Fig. 1, the bridging contact and float are indicated in their upper positions by dotted lines, the float being held in its upper position by the buoyant action of the fluid and as the level of the fluid lowers due to evaporation or any other cause the float is lowered proportionately until the conductor pins 30 submerge in the mercury completing the connection between the conductor pins 34 and thus completing the circuit between the storage battery and light bulb when the switch 38 is closed. The light bulb being illuminated indicates that the fluid level is approaching a dangerous level and that the cells should be refilled so as to not cause overheating or warping of the electrode plates by reason of lack of fluid within the cells. Upon refilling of the cells the fluid level is raised and the buoyant action of the fluid causes the float and the bridging contact to raise proportionately at which time the conductor pins 30 are raised from submerged position in the mercury breaking the connection between the conductor pins 34.

In Figs. 3 and 4, I illustrate a modified form of construction which includes a similar plunger 17' and bridging contact 40 likewise provided with depending conductor pins 41 which are adapted for contact with contact screws 42 carried by segmental conductor plates 43 positioned on the end portions 44 of the conductor pins 34'. These segmental conductor plates are carried by a disc 45 formed of insulating material and provided with circumferentially thread-bearing surfaces 45' for threaded engagement with the threaded portion of the neck 13'.

The operation of this plunger 17' and bridging contact 40 is substantially the same as the operation of the plunger 16 and bridging contact 20.

From the description herein it is apparent that I provide an indicator which can be associated with a storage battery of standard make without making any material changes in the construction of the same.

While I have shown and described the preferred form of my invention, it will be apparent that various changes and alterations may be resorted to during manufacture without departing from the spirit of the invention or the scope of the appended claims.

The invention having thus been set forth, what I claim as new and useful is:—

1. The combination with a cell of a storage battery having a neck portion, of a body confined in the neck portion and having threaded engagement therewith and having a recess formed therein, a receptacle confined in the recess and provided with separate chambers, a conductive fluid confined in the chambers, contact elements extending into the chambers into the body of the conductive fluid, a bridging contact having portions adapted to be submerged in the conductive fluid to complete a connection between the contact elements, and means operative by the lowering of the level of the fluid within the cell for operating said bridging contact.

2. A device of the class described including an externally threaded body adapted for threaded engagement within a neck portion of a storage battery and defining a receptacle divided into separate compartments adapted to accommodate a predetermined amount of conductive fluid, oppositely disposed conductor elements carried by the body and having end portions submerged in the conductive fluid, and a bridging contact having portions adapted under certain conditions to be submerged in the conductive fluid to complete a circuit connection between the conductor elements.

In testimony whereof I affix my signature.

ROBERT E. CURTIS.